United States Patent
Nightingale et al.

[11] Patent Number: 5,852,692
[45] Date of Patent: Dec. 22, 1998

[54] TAPERED OPTICAL FIBER DELIVERY SYSTEM FOR LASER DIODE

[75] Inventors: John Lawrence Nightingale, Portola Valley; Michael Jansen, Palo Alto; Ronii Chris Mehl, Mountain View; Michael Hmelar, Palo Alto, all of Calif.

[73] Assignee: Coherent, Inc., Santa Clara, Calif.

[21] Appl. No.: 857,940

[22] Filed: May 16, 1997

[51] Int. Cl.⁶ ................................................ G02B 6/26
[52] U.S. Cl. ............................................................. 385/43
[58] Field of Search ............................ 385/40–43, 31, 385/39, 147, 88, 93, 85, 76

[56] References Cited

U.S. PATENT DOCUMENTS

| | | | |
|---|---|---|---|
| 3,825,319 | 7/1974 | Cook et al. | 350/96 |
| 4,432,807 | 2/1984 | Shirasaka et al. | 134/2 |
| 4,654,532 | 3/1987 | Hirschfeld | 250/458.1 |
| 4,688,884 | 8/1987 | Scifres et al. | 350/96.15 |
| 4,720,163 | 1/1988 | Goodwin et al. | 385/90 |
| 4,729,621 | 3/1988 | Edelman | 350/96.15 |
| 4,820,010 | 4/1989 | Scifres et al. | 350/96.15 |
| 4,877,300 | 10/1989 | Newhouse et al. | 385/43 |
| 4,900,114 | 2/1990 | Mortimore et al. | 350/96.15 |
| 4,930,859 | 6/1990 | Hoffman, III | 350/96.21 |
| 4,983,014 | 1/1991 | Nattermann | 350/96.24 |
| 5,022,043 | 6/1991 | Jacobs | 372/95 |
| 5,058,978 | 10/1991 | Kondoh et al. | 385/43 |
| 5,138,676 | 8/1992 | Stowe et al. | 385/32 |
| 5,222,171 | 6/1993 | Straus | 385/96 |
| 5,301,252 | 4/1994 | Yanagawa et al. | 385/96 |
| 5,309,536 | 5/1994 | Suganuma et al. | 385/43 |
| 5,333,218 | 7/1994 | Ortiz, Jr. | 385/43 |
| 5,371,816 | 12/1994 | Pam | 385/33 |
| 5,394,492 | 2/1995 | Hwang | 385/33 |
| 5,420,948 | 5/1995 | Byron | 385/37 |
| 5,438,873 | 8/1995 | Wlodarczyk et al. | 73/705 |
| 5,511,140 | 4/1996 | Cina et al. | 385/93 |
| 5,511,141 | 4/1996 | Peli | 385/116 |
| 5,537,504 | 7/1996 | Cina et al. | 385/93 |
| 5,562,839 | 10/1996 | Pan | 216/26 |

FOREIGN PATENT DOCUMENTS 2 140 930   5/1994   United Kingdom ............ G02B 5/14

*Primary Examiner*—Akm E. Ullah
*Attorney, Agent, or Firm*—Limbach & Limbach L.L.P.

[57] ABSTRACT

An optical fiber delivery system having a semiconductor light source that produces an optical output. A plurality of first optical fibers each has an input end and an output end. The input ends are optically coupled to the semiconductor light source to receive the optical output, and the output ends are bundled together. An optical connector positions the input end of a second fiber, relative to the first fiber output ends, to receive the optical output from the first fibers. Either each of the first fibers, or the second fiber, have a tapered segment with a core and a cladding tapered down smoothly in diameter to reduce the spot size of optical output.

20 Claims, 8 Drawing Sheets

TAPERED OPTICAL FIBER DELIVERY SYSTEM FOR LASER DIODE

FIELD OF THE INVENTION

The present invention relates to optical fiber delivery systems, and more particularly to optical fibers used to deliver the optical output from laser diodes to end user applications.

BACKGROUND OF THE INVENTION

A multi-emitter laser diode produces a plurality of optical beams, one from each emitter. A common method of delivering the laser diode optical output to an end user application includes coupling the output beams into a plurality of transport optical fibers. The input ends of the transport fibers are aligned with the laser diode emitters. The output ends of the transport fibers are arranged into a tightly packed circular array to minimize the spot size of the composite optical beams (overall laser diode output) exiting the transport fibers. Coupling optics are placed between the laser diode emitters and the transport fiber input ends to properly focus the laser diode output beams into the array of transport fibers.

It is known to enclose the laser diode, coupling optics and transport fiber input ends inside a sealed laser diode housing to prevent the contamination thereof. It is also known to place an optical fiber connector at the laser diode housing wall for coupling the optical output out of the laser diode housing while maintaining the seal of the housing. The transport fibers terminate at the optical fiber connector. A delivery fiber from outside of the laser diode housing is butted against the ends of the transport fibers (butt coupled) by the fiber optic connector. The delivery fiber is a single optical fiber having a diameter matched to the diameter of the entire circular array of transport fibers in order to capture all of the optical output exiting the transport fibers.

The spot size of the laser diode optical output at the optical connector is at least as large as the diameter of the circular array of transport fibers. It is desirous to minimize the spot size at the optical connector so that a smaller diameter delivery fiber can be used, which results in a smaller emission diameter at the output end of the delivery fiber. A smaller emission diameter can simplify the design of optical systems at the intended end user application. Further, an optical fiber with a smaller diameter is less expensive and has a smaller bend radius.

The circular array of transport fibers, however, can be packed only so tight to achieve a smaller overall fiber array diameter. Further, the selected diameter of the transport fibers can be reduced only so far without either requiring complicated coupling configurations at the laser diode emitters, or resulting in coupling losses at the transport fiber input ends.

Complicated and expensive fiber core fusing techniques have been used to further reduce the diameter of the transport fibers. For example, U.S. Pat. No. 4,820,010, issued to Scifres et al on Apr. 11, 1989, describes heating the end of a bundle of fibers beyond the fibers' melting point to form a tapered output rod having a smaller diameter than the overall diameter of the fiber bundle. However, the molten tapered rod contains both the core and clad materials which, unless thoroughly mixed, will cause light scattering. Further, there is no cladding left around the tapered rod, which will result in the leakage of light if the rod surface is not perfectly smooth and/or there is any surface contamination.

There is a need for a simple and inexpensive laser diode delivery system that reduces the spot size of the laser diode output, even while combining a plurality of optical outputs together, while coupling the laser diode output into a delivery fiber of reduced diameter to utilize smaller delivery fibers and achieve smaller laser output emission diameters.

SUMMARY OF THE INVENTION

The present invention solves the aforementioned problems by changing the emission diameter of the laser diode output near the laser diode housing connector in a guided-wave format with low optical loss.

The optical fiber delivery system of the present invention includes a semiconductor light source that produces an optical output. A first optical fiber has an input end and an output end, with the input end positioned to receive the optical output. A second optical fiber has an input end and an output end. A quick disconnect optical connector removably butt couples the input end of the second fiber to the output end of the first fiber, to receive the optical output from the first fiber. One of the first and second fibers has a tapered segment with a core and a cladding tapered down smoothly in diameter. The diameters of the core and cladding at the input end of the one first and second fiber are larger than core and cladding diameters respectively at the output end of the one first and second fiber.

In another aspect of the present invention, the optical fiber delivery system includes a semiconductor light source that produces an optical output. A plurality of first optical fibers each has an input end and an output end. The input ends are optically coupled to the semiconductor light source to receive the optical output. The output ends are bundled together. A second optical fiber has an input end and an output end. An optical connector positions the second fiber input end, relative to the first fiber output ends, to receive the optical output from the first fibers. At least each of the first fibers, or the second fiber, has a tapered segment with a core and a cladding tapered down smoothly in diameter.

In yet another aspect of the present invention, the optical fiber delivery system includes a plurality of laser diode assemblies. Each laser diode assembly includes a laser diode having a plurality of emitters that each emit an optical beam, and a plurality of first optical fibers with input ends each positioned to receive one of the optical beams from the emitters and output ends that are bundled together. A plurality of second optical fibers each have an input end and an output end. The second fiber output ends are bundled together. A plurality of first optical connectors each of which butt couple one of the second fiber input ends to one of the bundles of the first fiber output ends. Each of the second fibers have a tapered segment with a core and a cladding tapered down smoothly in diameter. The diameters of the core and cladding at each of the second fiber input ends are larger than core and cladding diameters respectively at each corresponding second fiber output end.

Other objects and features of the present invention will become apparent by a review of the specification and appended figures.

DETAILED DESCRIPTION OF THE PREFERRED EMBODIMENTS

Figure 1:
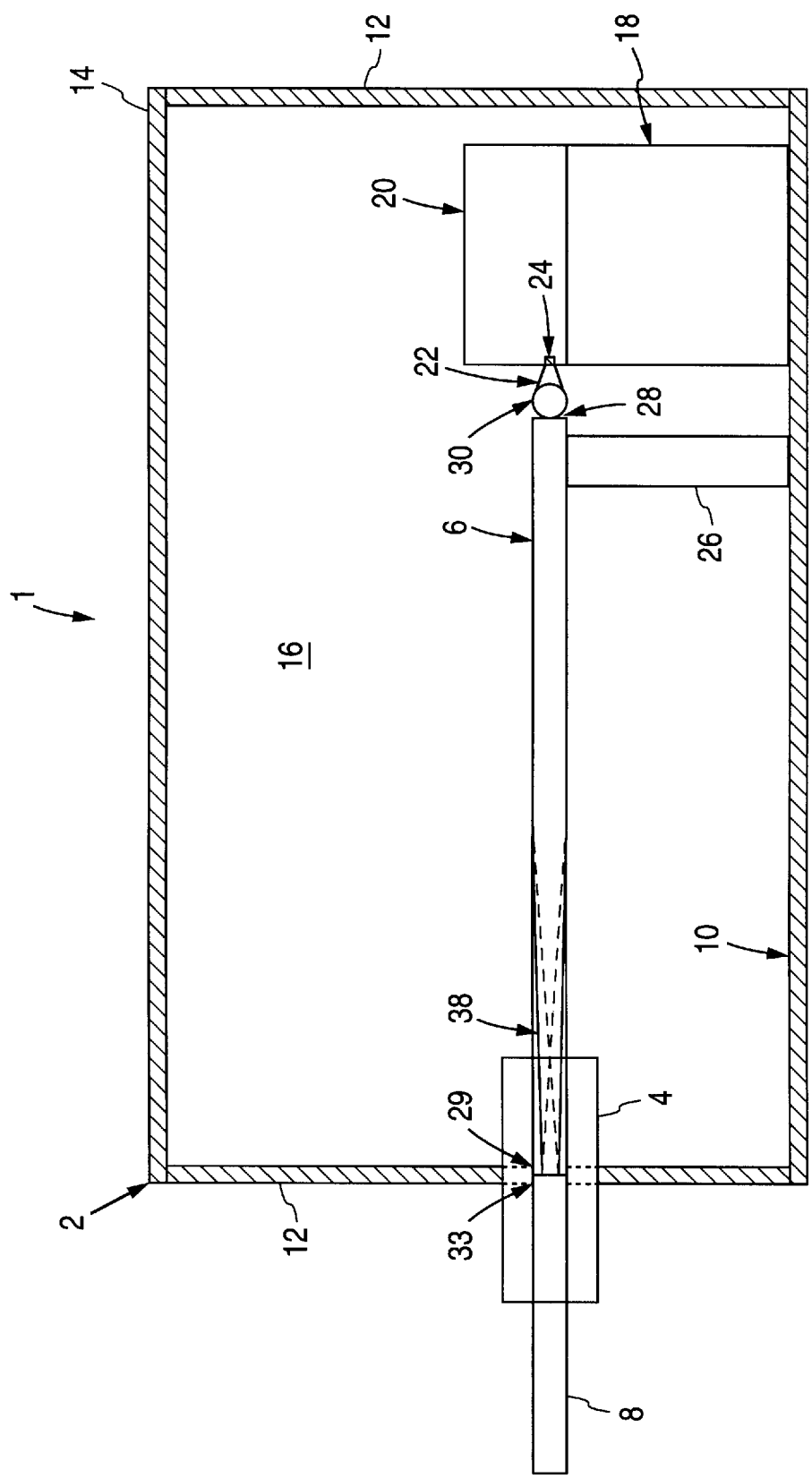
FIG. 1 is a cross-sectional side view of the laser diode enclosure with the tapered fibers of the present invention.
Figure 2:
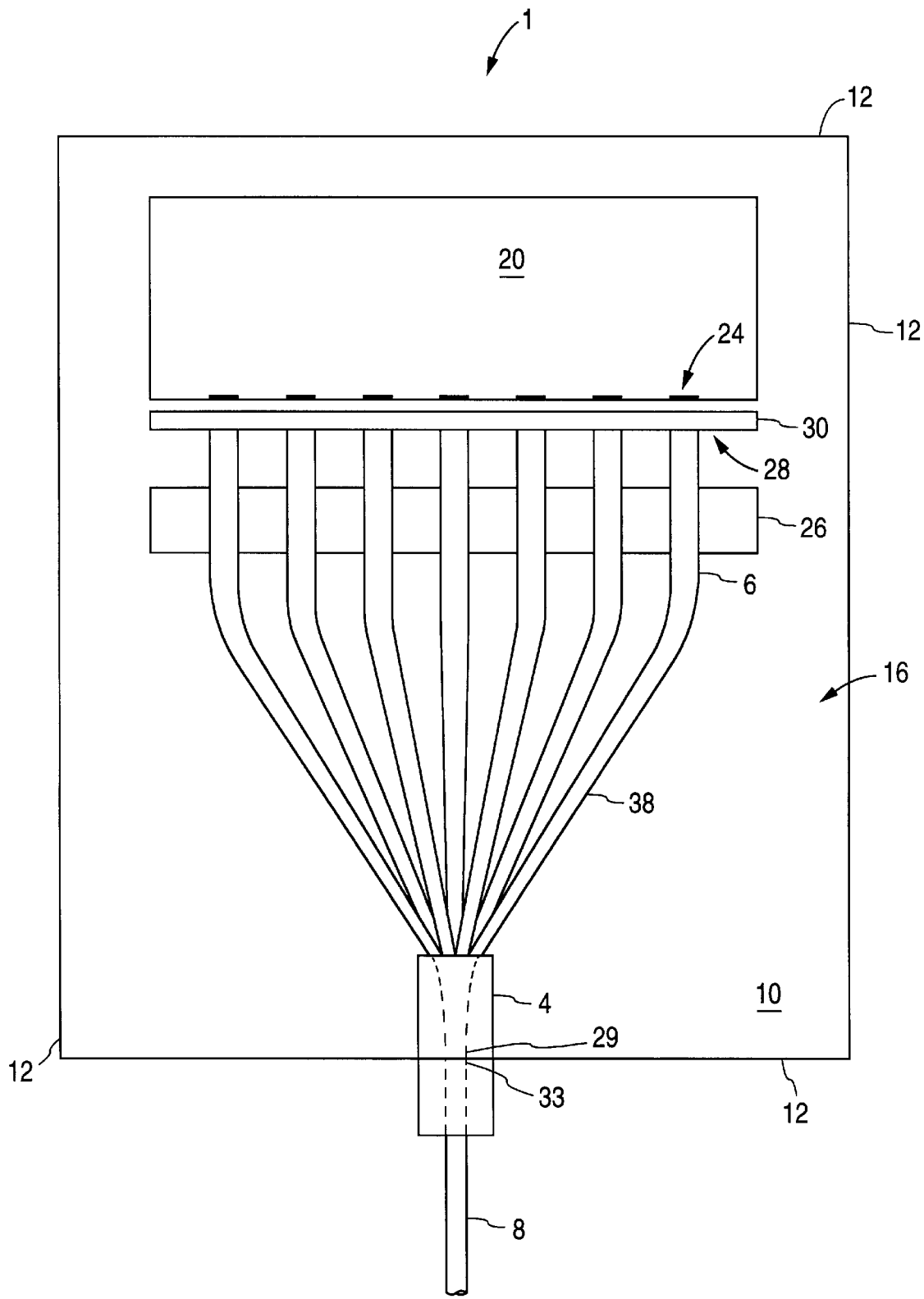
FIG. 2 is a top view of the laser diode enclosure with the lid removed illustrating the tapered fibers of the present invention.

The present invention is a laser diode assembly 1 that couples the optical output from a plurality of individual light sources into a single optical fiber while reducing the overall optical output emission diameter (spot size) in a guided-wave format with minimal optical loss. The laser diode assembly 1 includes a laser diode housing 2, and an optical connector 4 for coupling an array of transport fibers 6 to a delivery fiber 8, as illustrated in FIGS. 1–2. The transport fibers 6 transmit the optical output out of the laser diode assembly, and the delivery fiber 8 transmits the optical output from the transport fibers to the intended application.

The laser diode housing 2 includes a base plate 10, side walls 12 and a lid 14, which define a sealed space 16 therein. Optical connector 4 is mounted through a hole in one of the walls 12, and forms a seal therewith.

Inside the sealed space 16, a heatsink 18 is mounted to the base plate 10. A laser diode bar 20 is mounted to the heatsink 18 so that there is good thermal and electrical conduction. The laser diode bar 20 produces an optical output 22 that exits the laser diode bar 20 through a plurality of emitters 24.

The array of transport fibers 6 is attached to a support block 26, preferably by solder or glue, such that the input ends 28 of the fibers 6 are each aligned to one of the emitters 24. A cylindrical lens 30 disposed across the input ends 28 of transport fibers 6 collimate and/or focus the optical output from each laser diode emitter 24 into the corresponding fiber 6. In the preferred embodiment, the cylindrical lens 30 is spaced approximately 30 μm from the diode emitters 24.

Figure 3:
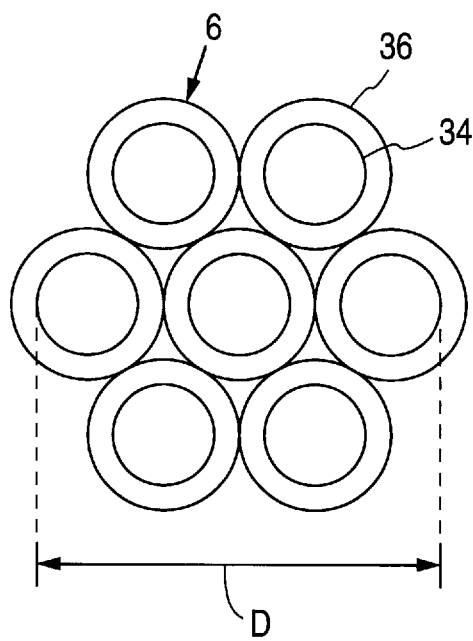
FIG. 3 is an end cross-sectional view of the circular array configuration of the output ends of the transport fibers.
Figure 4:
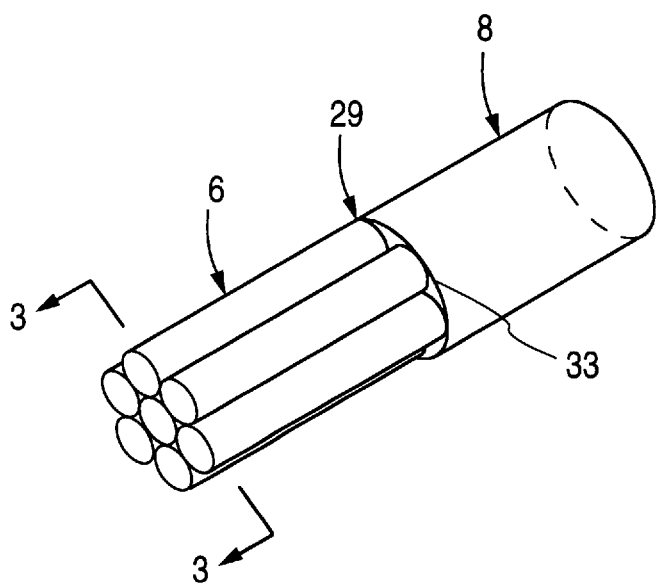
FIG. 4 is a perspective view of the optical fiber array butt coupled to the delivery optical fiber.

The transport fibers 6 extend to and terminate at the optical connector 4. As illustrated in FIG. 3, the output ends 29 of the transport fibers 6 are bundled together in a tightly packed circular configuration (i.e. a closed pack hexagonal array if seven transport fibers 6 are used as illustrated in FIG. 3) having an overall diameter D (that does not include the fiber claddings) to produce a single composite optical output from the individual output beams exiting the output ends of fibers 6. The output ends 29 are butted up against (butt coupled with) the input end 33 of delivery fiber 8 inside optical connector 4, as illustrated in FIGS. 1–2 and 4. Output ends 29 and input end 33 are preferably anti-reflection coated for efficient optical butt coupling. With this configuration, the input end 33 of delivery fiber 8 ideally has a diameter approximately equal to or greater than diameter D in order to efficiently capture all the optical power exiting the bundle of transport fibers 6.

The optical connector 4 is ideally a quick disconnect SMA #905 connector, FC connector, or any equivalent thereof that removably butt couples output end 29 of transport fiber 6 to the input end 33 of delivery fiber 8. Alternately, connector 4 could be any permanent device, such as a glass sleeve glued to the fibers 6 and 8, etc., that permanently butt couples these fibers together.

It is desirous to minimize the diameter of the delivery fiber 8 to reduce the spot size of the optical output exiting therefrom, and to utilize cheaper delivery fibers having a smaller bend radius. Since delivery fiber 8 ideally has a diameter approximately equal to or greater than the overall diameter D of the transport fiber array, diameter D is minimized in accordance with the present invention by individually tapering down the diameter of transport fibers 6.

Figure 5:
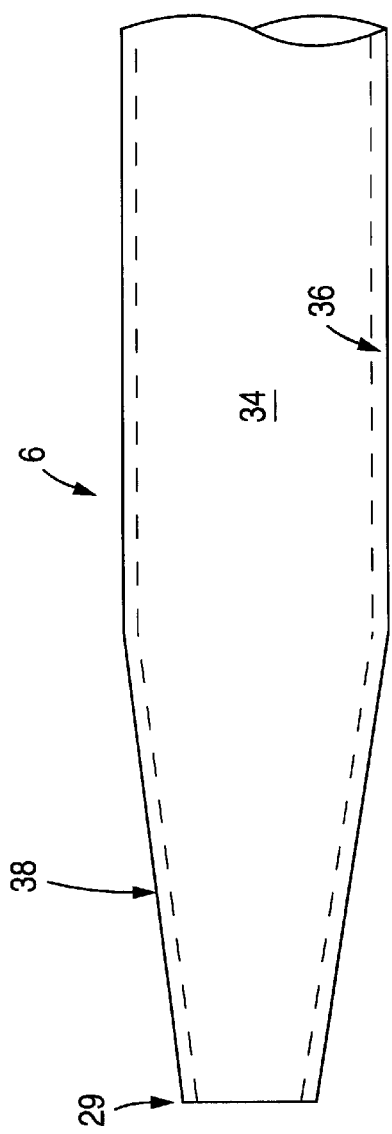
FIG. 5 is a side view of the tapered transport fiber of the present invention.

Each transport fiber 6 has a tapered section 38 so that output end 29 has a smaller diameter than input end 28. Each fiber 6 has a core 34, surrounded by a cladding 36, both of which having diameters that smoothly taper down in the tapered section 38, as best illustrated in FIG. 5. The reduced diameters of the output ends 29 results in a reduced overall diameter D of the circular bundle of transport fibers 6 at the optical connector 4. Ideally, the overall diameter D of the fiber array is approximately equal to or slightly less than the diameter of delivery fiber 8 to ensure efficient coupling and decrease losses due to mechanical alignment tolerances and manufacturing variances at the connector 4.

To form a tapered section 38, any buffer present is stripped off of a predetermined length of each fiber 6 from the output end 29. Heat is evenly applied to each predetermined length of fiber 6, while the output end 29 of each fiber 6 is pulled, to form tapered section 38. The amount of heat applied must be sufficient to raise the core 34 and cladding 36 to a high enough temperature so that they will stretch, thus resulting in a longer, but narrower, section of fiber. A simple method of pulling the fiber is to mount a small weight (a few ounces) to the output end 29 of the fiber while the predetermined length is being heated. The heat is applied evenly to form a tapered section 38 that evenly and concentrically tapers down to smaller diameters over its length. The heating and pulling of the fiber 6 continues until the desired core diameter at the output end 29 is achieved. Ideally, the fiber 6 is heated and pulled until a core diameter is achieved that is slightly smaller than the desired core diameter at the output end 29. Thereafter, the output end 29 of the fiber 6 is cleaved and polished back to achieve the actual desired core diameter value. Any conventional heat source can be used, such as a torch, a laser source, etc., that can evenly heat the predetermined length to produce an even, circular, tapered core diameter through the tapered section 38 of fiber 6. Once the fibers 6 have been tapered, they are bundled and attached to optical connector 4.

The tapering method described above is advantageous because it preserves the cladding 36 around core 34 throughout the tapered section 38, thus preventing any light from escaping out the side of optical fiber 6. The tapered section is a gradual, or adiabatic, taper made of low loss optical materials which preserves the intrinsic brightness of the emission pattern through the taper fiber section. The length of the tapered section 38 and the diameter of the core 34 at the output end 29 are such that, given the refractive indices of the materials used to make the core/cladding, and the optical properties of the propagating beam, the numerical aperture of the propagating beam does not exceed the intrinsic numerical aperture of the tapered section 38.

A further advantage of tapering the transport fiber 6 as described above is that the emission divergence of the laser energy exiting the laser diode housing can be matched to that of the lowest cost delivery fiber without any degradation in brightness. Further, matching the emission divergence at output 29 to the acceptance divergence of the delivery fiber 8 will minimize shifts in the light distribution associated with bending and flexing the fiber.

Figure 7:
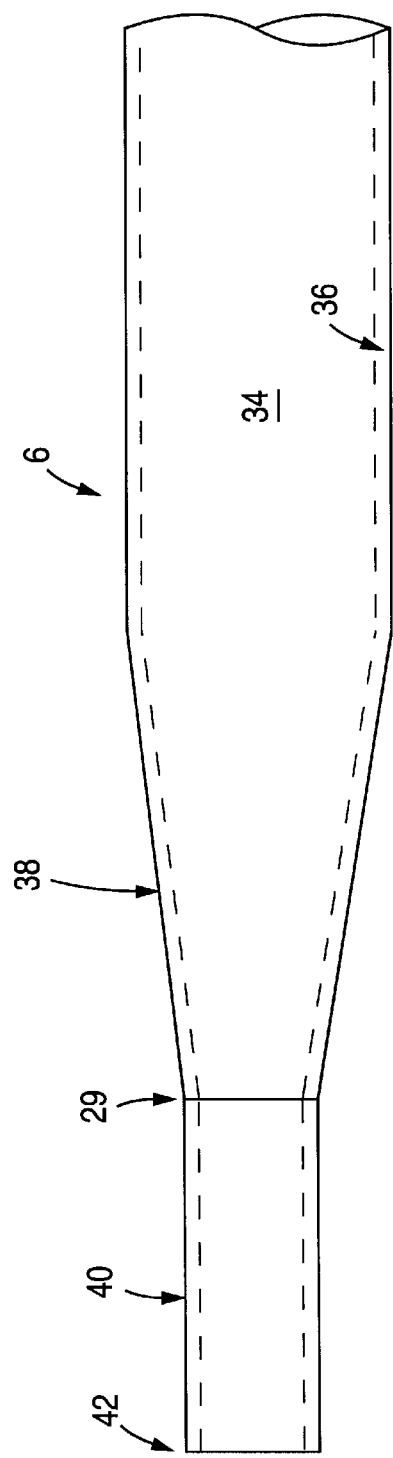
FIG. 7 is a side view of the tapered transport fiber of the present invention fused to a second fiber.
Figure 6:
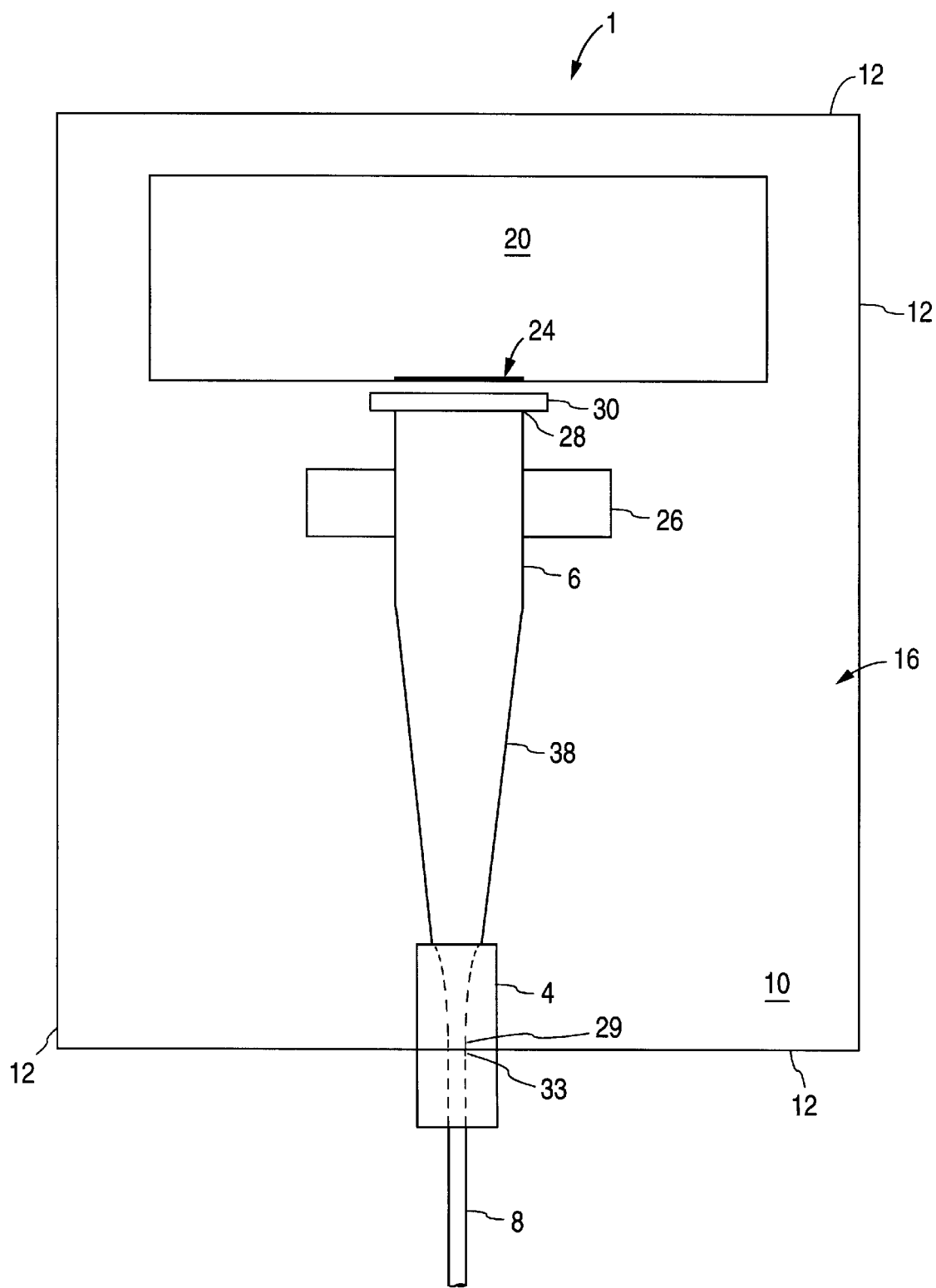
FIG. 6 is a top view of the laser diode enclosure with the lid removed illustrating a single tapered fiber.
Figure 8:
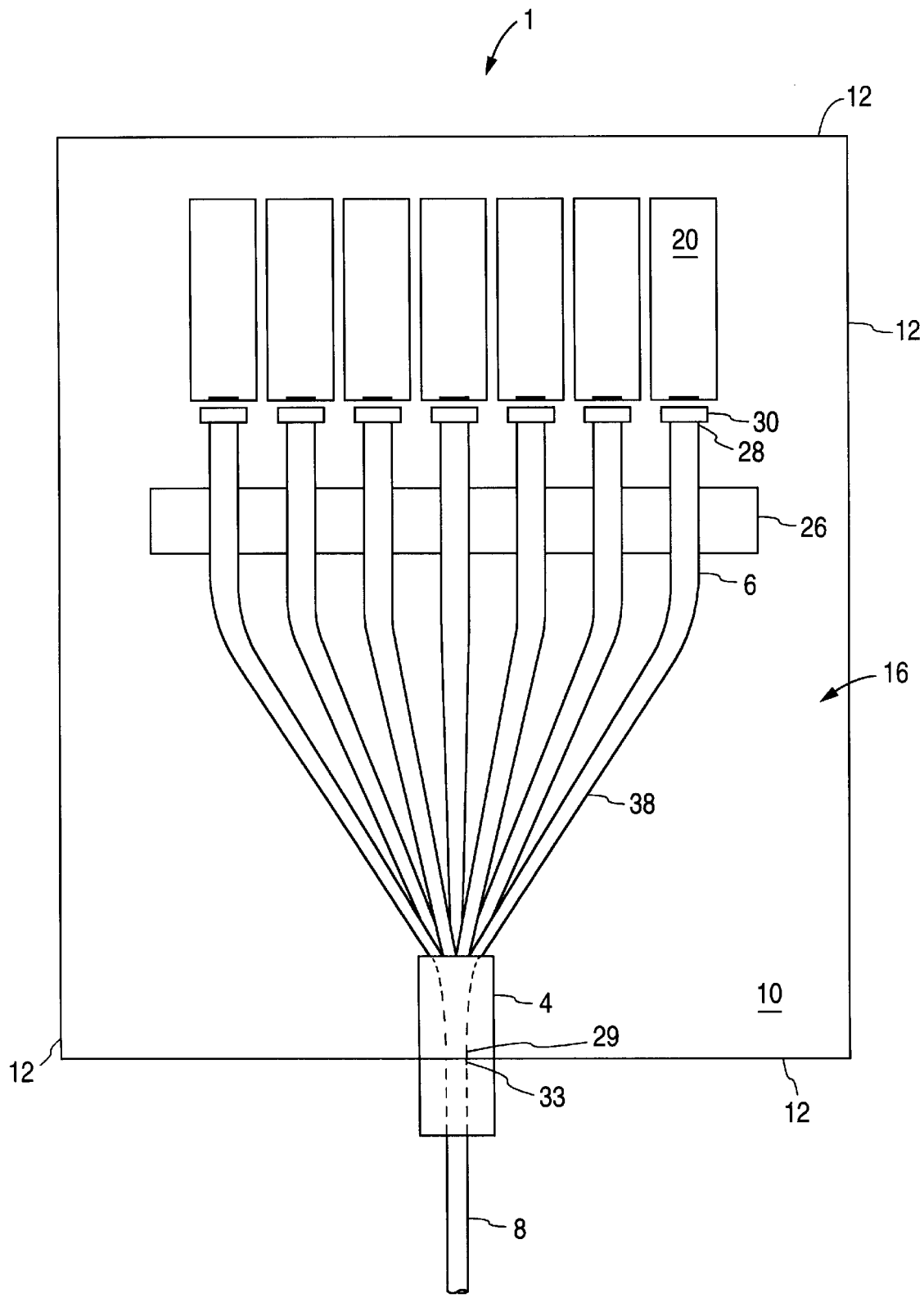
FIG. 8 is a top view of the laser diode enclosure with the lid removed illustrating multiple laser diodes coupled to the array of tapered fibers.

It should be noted that it is well within the scope of the present invention to use a laser diode 20 having a single emitter 24 optically coupled to a single tapered transport fiber 6, as illustrated in FIG. 6. Further, tapered section 38 need not terminate at output end 29 of transport fiber 6, but can be formed in a mid-fiber position, as illustrated in FIG. 7. In this embodiment, a smaller diameter fiber 40 is fused onto the output end 29 of the tapered fiber 6 using standard fiber fusing techniques, where the output end 42 of fiber 40 is butt coupled to delivery fiber 8. In addition, fibers 6 could originate from a plurality of different laser diodes 20, using a different cylindrical lens 30 for each transport fiber input end 28, as illustrated in FIG. 8.

Figure 9:
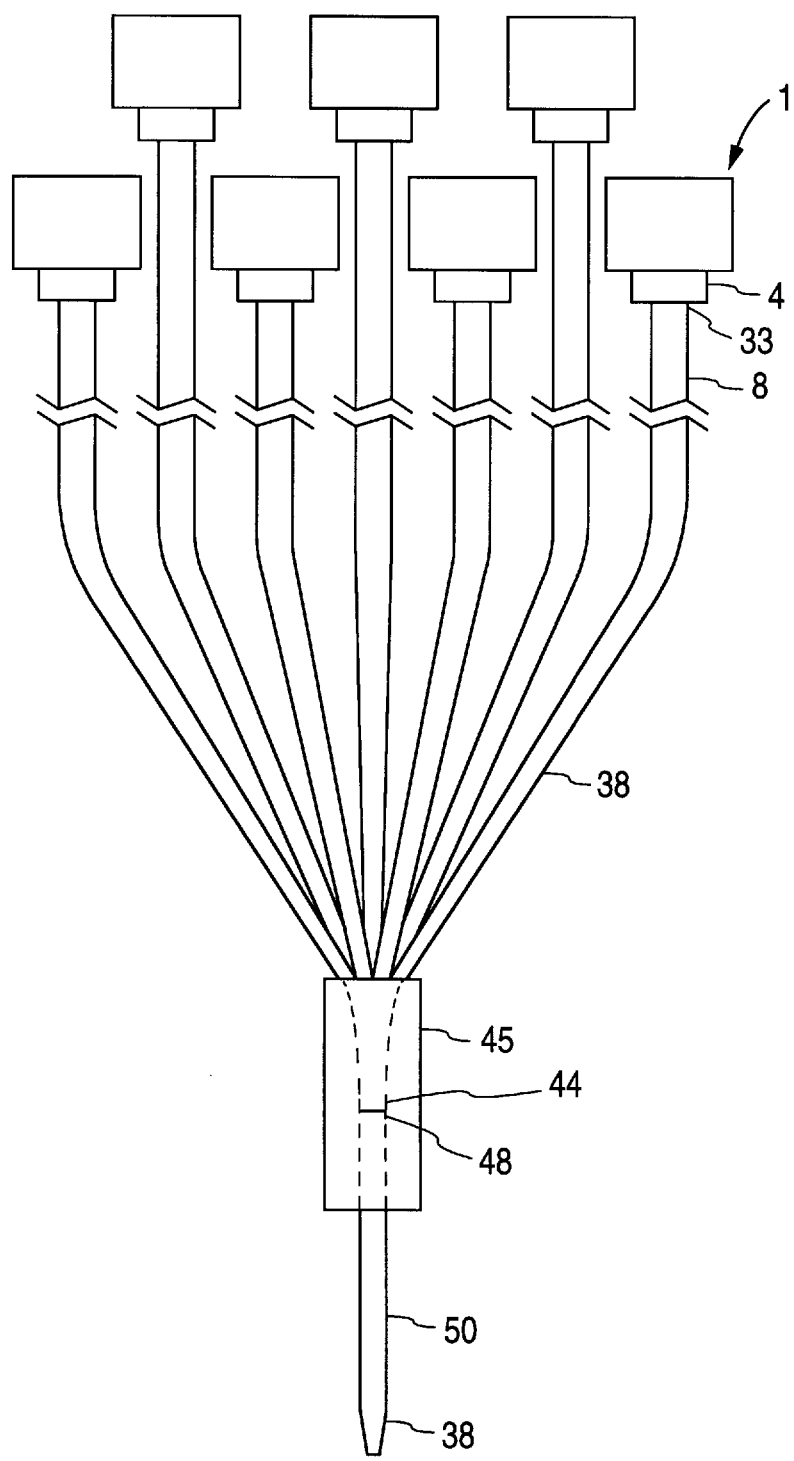
FIG. 9 is a top view of a plurality of laser diode assemblies with tapered delivery fibers bundled together.

The optical output from a plurality of laser diode assemblies 1 can be coupled together in a spot size reducing, guided wave fashion similar to that described above. FIG. 9 illustrates a plurality of sealed laser diode assemblies 1 with the output ends 44 of delivery fibers 8 bundled together in a tightly packed circular configuration to produce a single optical output therefrom. A second optical connector 45 butt couples the output ends 44 of delivery fibers 8 to the input end 48 of a second delivery fiber 50. Each delivery fiber 8 has a tapered section 38 so that output end 44 has a smaller diameter than input end 33. The reduced diameters of the output ends 44, and therefore the reduced overall diameter of the circular bundle of delivery fibers 8, result in a reduced optical output spot size at the second optical connector 45. Ideally, the overall diameter of the circular bundle of delivery fiber output ends 44 is approximately equal to or slightly less than the diameter of the input end 48 of fiber 50 to ensure efficient optical coupling. If an additional reduction in the optical output spot size exiting second delivery fiber 50 is desired, delivery fiber 50 can also have a tapered section 38, as illustrated in FIG. 9.

It should be noted that while FIGS. 2 and 9 illustrate fibers 6, 8 and 50 all having tapered sections 38, the scope of the present invention includes any combination of just one or more of fibers 6, 8 and 50 having a tapered section 38, depending upon the desired spot size and divergence of the optical output exiting fiber 50. Further, fiber 50 and connector 45 can be omitted from the embodiment shown in FIG. 9. In such a case, the composite output beam exiting the bundled output ends 44 of delivery fibers 8 is directly applied to the intended application.

Figure 10:
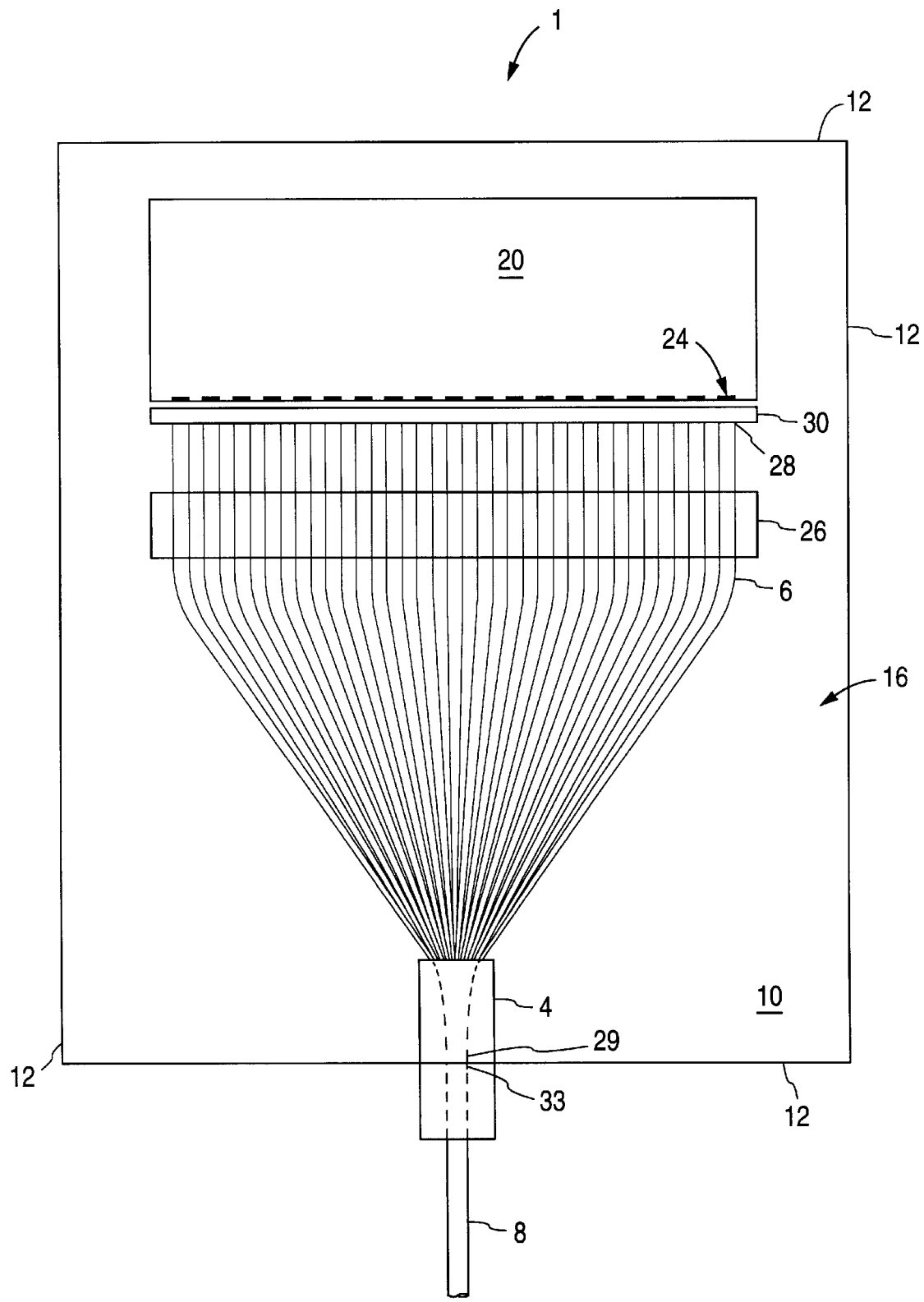
FIG. 10 is a top view of the laser diode enclosure with the lid removed illustrating the untapered transport fibers therein.

For example, a high powered fiber-delivered laser source having seven laser diode assemblies is illustrated in FIGS. 9–10, where each laser diode assembly 1 includes a laser diode bar 20 having nineteen emitters 24 and nineteen corresponding transport fibers 6, as illustrated in FIG. 10. The transport fibers 6 have 150 um diameter cores and 165 um diameter claddings. The transport fibers 6 are untapered, thereby not having any tapered sections 38. The output ends 29 of the transport fibers 6 are bundled together into a circular array having an overall effective diameter of about 810 um at the optical connector 4. The input end 33 of delivery fiber 8 has a diameter of 825 um and is butt coupled to the transport fibers 6 by the connector 4. The delivery fiber 8 has a tapered section 38 such that the output end 44 of delivery fiber 8 is 275 um core diameter (290 um cladding diameter), yielding a factor of three reduction in the emission diameter of the laser output. The seven output ends 44 of the delivery fibers 8 are bundled together into a circular array having an approximate overall effective diameter of about 855 um. A 1.0 mm core diameter fiber 50 is butt coupled to the array of delivery fibers 8 by the connector 45. With the present embodiment, a 100 watt optical output from 133 emitters in seven laser diodes bars 20 can be captured by 133 optical fibers each having a 150 um core, and are coupled into a single optical fiber 50 having a 1.0 mm diameter in a low loss guided-wave fashion.

It is to be understood that the present invention is not limited to the embodiments described above and illustrated herein. For example, the scope of the present invention includes any variation in the numbers of laser diode assemblies 1 and delivery fibers 8 used with any number of laser diodes 20 and emitters 24 and transport fibers 6 in each laser diode assembly 1, and any number of second delivery fibers 50, and with any combination of one or more of the fibers 6, 8 and 50 having, or not having, tapered sections 38.

What is claimed is:

1. An optical fiber delivery system, comprising:

a semiconductor light source that produces an optical output;

a first optical fiber having an input end and an output end, said input end positioned to receive the optical output;

a second optical fiber having an input end and an output end;

a quick disconnect optical connector that removably butt couples said second fiber input end to said first fiber output end to receive the optical output from said first fiber; and one of said first and second fibers having a tapered segment with a core and a cladding tapered down smoothly in diameter, wherein diameters of said core and cladding at said input end of the one of said first and second fibers are larger than core and cladding diameters respectively at said output end of the one of said first and second fibers.

2. The optical fiber delivery system of claim 1, wherein said tapered segment has a length, and said core and said cladding have a substantially circular cross-section over said length.

3. The optical fiber delivery system of claim 2, further comprising:

a housing defining a sealed space therein, said semiconductor light source and said first fiber being disposed inside said sealed space and said second fiber being disposed outside said sealed space, said optical connector disposed at a wall of said housing for coupling the optical output out of said sealed space from said first fiber output end into said second fiber input end, and for maintaining said seal.

4. The optical fiber delivery system of claim 3, wherein said wall defines a hole therein and said optical connector is disposed in and forms a seal with said hole, said optical connector butt couples said first fiber output end to said second fiber input end.

5. The optical fiber delivery system of claim 1, wherein the other of said one of said first and second fibers having a second tapered segment with a second core and a second cladding tapered down smoothly in diameter, wherein diameters of said second core and second cladding at said input end of the other of said one of said first and second fibers are larger than second core and cladding diameters respectively at said output end of the other of said one of said first and second fibers.

6. An optical fiber delivery system, comprising:

a semiconductor light source that produces an optical output;

a plurality of first optical fibers each having an input end and an output end, said input ends optically coupled to said semiconductor light source to receive the optical output, said output ends are bundled together;

a second optical fiber having an input end and an output end;

an optical connector for positioning said second fiber input end, relative to said first fiber output ends, to receive the optical output from said first fibers; and at least each of said first fibers, or said second fiber, having a tapered segment with a core and a cladding tapered down smoothly in diameter.

7. The optical fiber delivery system of claim 6, wherein each of said tapered segments each having a length, and said cores and claddings having a substantially circular cross-section over said length.

8. The optical fiber delivery system of claim 7, wherein said bundled first fiber output ends being disposed in a circular array configuration with an overall diameter that is substantially the same or smaller than the diameter of the input end of the second fiber.

9. The optical fiber delivery system of claim 8, wherein said optical connector is a quick disconnect connector that removably butt couples said first fiber output ends to said second fiber input end.

10. The optical fiber delivery system of claim 7, further comprising:

a housing defining a sealed space therein, said semiconductor light source and said first fibers being disposed inside said sealed space and said second fiber being disposed outside said sealed space, said optical connector disposed at a wall of said housing for coupling the optical output out of said sealed space from said first fiber output ends to said second fiber input end, and for maintaining said seal.

11. The optical fiber delivery system of claim 10, wherein said wall defines a hole therein and said optical connector is disposed in and forms a seal with said hole, said optical connector butt couples said first fiber output ends to said second fiber input end.

12. The optical fiber delivery system of claim 7, wherein said semiconductor light source is a plurality of laser diode assemblies, each of said laser diode assemblies including:

a laser diode with a plurality of emitters that each emit an optical beam, a plurality of third optical fibers with input ends each positioned to receive one of said optical beams from said emitters, and output ends bundled together, and a second optical connector that butt couples said bundle of third fiber output ends to one of said first fiber input ends.

13. The optical fiber delivery system of claim 12, wherein each of said third optical fibers having a second tapered segment with a second core and a second cladding tapered down smoothly in diameter.

14. An optical fiber delivery system, comprising:

a plurality of laser diode assemblies, each laser diode assembly including:

a laser diode having a plurality of emitters that each emit an optical beam, and a plurality of first optical fibers with input ends each positioned to receive one of said optical beams from said emitters, and output ends bundled together;

a plurality of second optical fibers each having an input end and an output end, said second fiber output ends are bundled together;

a plurality of first optical connectors each of which butt coupling one of said second fiber input ends to one of the bundles of said first fiber output ends of one of said plurality of laser diode assemblies; and each of said second fibers having a tapered segment with a core and a cladding tapered down smoothly in diameter, wherein diameters of said core and cladding at each of said second fiber input ends are larger than core and cladding diameters respectively at each corresponding second fiber output end.

15. The optical fiber delivery system of claim 14, further comprising:

a third optical fiber having an input end and an output end;

a second optical connector that butt couples the bundle of said second fiber output ends to said third fiber input end.

16. The optical fiber delivery system of claim 15, wherein each of said tapered segments each having a length, and each of said cores and claddings having a substantially circular cross-section over said length.

17. The optical fiber delivery system of claim 16, wherein:

each of said bundled first fiber output ends being disposed in a circular array configuration with an overall diameter that is substantially the same or smaller than the diameter of the corresponding second fiber input end that is butt coupled thereto; and said bundled second fiber output ends being disposed in a circular array configuration with an overall diameter that is substantially the same or smaller than the diameter of said third fiber input end that is butt coupled thereto.

18. The optical fiber delivery system of claim 17, wherein said first and second optical connectors are quick disconnect connectors.

19. The optical fiber delivery system of claim 15, wherein said third optical fiber having a second tapered segment with a second core and a second cladding tapered down smoothly in diameter, wherein diameters of said second core and second cladding at said third fiber input end are larger than core and cladding diameters respectively at said third fiber output end.

20. The optical fiber delivery system of claim 15, wherein each of said first optical fibers having a second tapered segment with a second core and a second cladding tapered down smoothly in diameter, wherein diameters of said second core and second cladding at each of said first fiber input ends are larger than core and cladding diameters respectively at each corresponding first fiber output end.

* * * * *